(12) United States Patent
Loritsch et al.

(10) Patent No.: US 11,330,335 B1
(45) Date of Patent: *May 10, 2022

(54) PRESENTATION AND MANAGEMENT OF AUDIO AND VISUAL CONTENT ACROSS DEVICES

(71) Applicant: Amazon Technologies, Inc., Seattle, WA (US)

(72) Inventors: Michael Lee Loritsch, Seattle, WA (US); John Martin Miller, Seattle, WA (US); Paul Anthony Kotas, Seattle, WA (US); Ross Tucker, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/695,513

(22) Filed: Nov. 26, 2019

Related U.S. Application Data

(63) Continuation of application No. 15/710,911, filed on Sep. 21, 2017, now Pat. No. 10,531,157.

(51) Int. Cl.
| | |
|---|---|
| *H04N 21/472* | (2011.01) |
| *G10L 15/08* | (2006.01) |
| *G06F 3/16* | (2006.01) |
| *G10L 15/22* | (2006.01) |
| *H04N 21/45* | (2011.01) |

(52) U.S. Cl.
CPC ....... *H04N 21/47202* (2013.01); *G06F 3/165* (2013.01); *G06F 3/167* (2013.01); *G10L 15/08* (2013.01); *G10L 15/22* (2013.01); *H04N 21/4524* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 8,639,214 B1 * | 1/2014 | Fujisaki | H04M 11/007 455/406 |
| 9,313,317 B1 * | 4/2016 | LeBeau | G10L 13/08 |
| 9,361,885 B2 * | 6/2016 | Ganong, III | G10L 15/22 |
| 9,443,527 B1 * | 9/2016 | Watanabe | G10L 15/26 |
| 9,691,378 B1 * | 6/2017 | Meyers | G10L 15/20 |
| 9,779,732 B2 * | 10/2017 | Lee | G06F 1/3293 |
| 9,779,734 B2 * | 10/2017 | Lee | G10L 15/24 |
| 9,781,532 B2 * | 10/2017 | Sheen | H04R 29/007 |
| 9,805,733 B2 * | 10/2017 | Park | G10L 21/00 |
| 10,089,981 B1 * | 10/2018 | Elangovan | H04M 1/271 |
| 10,134,388 B1 * | 11/2018 | Lilly | G10L 15/063 |

(Continued)

*Primary Examiner* — Mohammad K Islam
(74) *Attorney, Agent, or Firm* — Eversheds Sutherland (US) LLP

(57) ABSTRACT

Systems, methods, and computer-readable media are disclosed for systems and methods of presentation and management of audio and visual content across devices. Example methods may include causing presentation of first audio content at a speaker device, causing presentation of a first audio notification indicative of visual content available for presentation, causing presentation of second audio content after the first audio notification, and sending first visual content to a first display device for presentation during presentation of the second audio content.

18 Claims, 5 Drawing Sheets

(56) References Cited

U.S. PATENT DOCUMENTS

| | | | |
|---|---|---|---|
| 10,186,266 B1* | 1/2019 | Devaraj | G10L 17/06 |
| 10,229,680 B1* | 3/2019 | Gillespie | G06F 40/295 |
| 10,339,957 B1* | 7/2019 | Chenier | G10L 25/48 |
| 10,365,887 B1* | 7/2019 | Mulherkar | G06F 3/167 |
| 10,445,365 B2* | 10/2019 | Luke | H04L 65/602 |
| 10,510,340 B1* | 12/2019 | Fu | G10L 15/22 |
| 10,515,625 B1* | 12/2019 | Metallinou | G10L 15/26 |
| 10,573,312 B1* | 2/2020 | Thomson | G10L 15/187 |
| 10,579,236 B2* | 3/2020 | Chen | G10L 15/26 |
| 10,600,406 B1* | 3/2020 | Shapiro | G10L 15/22 |
| 10,623,811 B1* | 4/2020 | Cwik | H04N 21/4122 |
| 10,643,609 B1* | 5/2020 | Pogue | G10L 25/51 |
| 10,685,669 B1* | 6/2020 | Lan | G10L 15/1822 |
| 10,706,843 B1* | 7/2020 | Elangovan | G10L 15/22 |
| 10,728,196 B2* | 7/2020 | Wang | H04L 51/10 |
| 10,777,189 B1* | 9/2020 | Fu | G10L 15/22 |
| 10,847,149 B1* | 11/2020 | Mok | G10L 15/08 |
| 10,867,596 B2* | 12/2020 | Yoneda | G10L 21/0208 |
| 10,878,826 B2* | 12/2020 | Li | G10L 17/22 |
| 2001/0003173 A1* | 6/2001 | Lim | G10L 15/20 704/239 |
| 2004/0128135 A1* | 7/2004 | Anastasakos | G10L 15/30 704/270.1 |
| 2008/0248797 A1* | 10/2008 | Freeman | H04M 1/72454 455/425 |
| 2011/0046952 A1* | 2/2011 | Koshinaka | G10L 15/063 704/243 |
| 2011/0131032 A1* | 6/2011 | Yang | G06F 40/45 704/2 |
| 2012/0009906 A1* | 1/2012 | Patterson | H04W 4/20 455/414.1 |
| 2014/0149118 A1* | 5/2014 | Lee | G10L 15/22 704/251 |
| 2014/0161263 A1* | 6/2014 | Koishi | G06F 16/683 381/56 |
| 2014/0278372 A1* | 9/2014 | Nakadai | G06F 16/686 704/9 |
| 2014/0278933 A1* | 9/2014 | McMillan | G06Q 30/0246 705/14.45 |
| 2014/0303969 A1* | 10/2014 | Inose | G10L 15/22 704/231 |
| 2014/0334645 A1* | 11/2014 | Yun | G10L 15/22 381/110 |
| 2014/0358535 A1* | 12/2014 | Lee | G10L 17/22 704/233 |
| 2014/0368734 A1* | 12/2014 | Hoffert | H04L 65/60 348/564 |
| 2015/0039317 A1* | 2/2015 | Klein | G10L 15/32 704/275 |
| 2015/0058018 A1* | 2/2015 | Georges | G10L 15/08 704/257 |
| 2016/0055850 A1* | 2/2016 | Nakadai | G10L 15/32 704/235 |
| 2016/0140957 A1* | 5/2016 | Duta | G10L 15/063 704/244 |
| 2016/0148615 A1* | 5/2016 | Lee | G06F 1/324 704/275 |
| 2016/0212488 A1* | 7/2016 | Os | H04N 21/2541 |
| 2016/0217789 A1* | 7/2016 | Lee | G10L 15/32 |
| 2017/0032244 A1* | 2/2017 | Kurata | G06N 3/084 |
| 2017/0053648 A1* | 2/2017 | Chi | G10L 15/22 |
| 2017/0053650 A1* | 2/2017 | Ogawa | G10L 15/063 |
| 2017/0076720 A1* | 3/2017 | Gopalan | G10L 15/22 |
| 2017/0076726 A1* | 3/2017 | Bae | G10L 15/22 |
| 2017/0090864 A1* | 3/2017 | Jorgovanovic | G10L 21/0332 |
| 2017/0103748 A1* | 4/2017 | Weissberg | G10L 15/063 |
| 2017/0103755 A1* | 4/2017 | Jeon | H04L 12/2821 |
| 2017/0186425 A1* | 6/2017 | Dawes | G10L 15/222 |
| 2017/0300289 A1* | 10/2017 | Gattis | G10L 19/018 |
| 2017/0300990 A1* | 10/2017 | Tanaka | G10L 15/08 |
| 2017/0329397 A1* | 11/2017 | Lin | G06F 3/013 |
| 2017/0357390 A1* | 12/2017 | Alonso Ruiz | G06F 3/04886 |
| 2018/0012077 A1* | 1/2018 | Laska | G11B 27/105 |
| 2018/0033428 A1* | 2/2018 | Kim | G10L 15/22 |
| 2018/0139512 A1* | 5/2018 | Moran | G06F 1/1607 |
| 2018/0182383 A1* | 6/2018 | Kim | G06N 3/0445 |
| 2018/0182397 A1* | 6/2018 | Carbune | G10L 15/22 |
| 2018/0188948 A1* | 7/2018 | Ouyang | G06F 3/0233 |
| 2018/0211665 A1* | 7/2018 | Park | G06F 3/167 |
| 2018/0233142 A1* | 8/2018 | Koishida | G01S 5/28 |
| 2018/0286394 A1* | 10/2018 | Li | G10L 17/24 |
| 2018/0286414 A1* | 10/2018 | Ravindran | G10L 25/24 |
| 2018/0349093 A1* | 12/2018 | McCarty | H04L 12/282 |
| 2019/0037173 A1* | 1/2019 | Lee | H04W 4/18 |
| 2019/0043488 A1* | 2/2019 | Bocklet | G06N 7/005 |
| 2019/0051298 A1* | 2/2019 | Lee | H04M 1/72403 |
| 2019/0081810 A1* | 3/2019 | Jung | G10L 15/30 |
| 2019/0087455 A1* | 3/2019 | He | G06F 40/253 |
| 2019/0206391 A1* | 7/2019 | Busch | G10L 15/16 |
| 2019/0237067 A1* | 8/2019 | Friedman | G10L 15/22 |
| 2019/0244608 A1* | 8/2019 | Choi | G10L 15/08 |
| 2019/0288970 A1* | 9/2019 | Siddiq | G06Q 50/01 |
| 2019/0289367 A1* | 9/2019 | Siddiq | H04N 21/4312 |
| 2019/0295542 A1* | 9/2019 | Huang | G10L 15/30 |
| 2019/0348044 A1* | 11/2019 | Chun | G06N 3/004 |
| 2019/0362714 A1* | 11/2019 | Mori | G10L 15/08 |
| 2020/0074990 A1* | 3/2020 | Kim | G10L 17/18 |
| 2020/0090647 A1* | 3/2020 | Kurtz | G06F 3/167 |
| 2020/0098354 A1* | 3/2020 | Lin | G10L 15/22 |
| 2020/0105245 A1* | 4/2020 | Gupta | G10L 13/033 |
| 2020/0105264 A1* | 4/2020 | Jang | G06F 3/0485 |
| 2020/0211539 A1* | 7/2020 | Lee | G10L 21/0208 |
| 2020/0211550 A1* | 7/2020 | Pan | G10L 15/063 |
| 2020/0234709 A1* | 7/2020 | Kunitake | G10L 15/22 |
| 2020/0265838 A1* | 8/2020 | Lee | G06F 1/3287 |
| 2020/0310751 A1* | 10/2020 | Anand | H04R 1/1041 |
| 2021/0067867 A1* | 3/2021 | Kagoshima | G10L 21/0208 |
| 2021/0109643 A1* | 4/2021 | Baseggio | G06F 3/04817 |
| 2021/0166680 A1* | 6/2021 | Jung | G10L 15/183 |
| 2021/0183366 A1* | 6/2021 | Reinspach | G10L 15/187 |
| 2021/0280185 A1* | 9/2021 | Tan | H04N 21/47815 |

* cited by examiner

PRESENTATION AND MANAGEMENT OF AUDIO AND VISUAL CONTENT ACROSS DEVICES

CROSS-REFERENCE TO RELATED APPLICATION(S)

This application is a continuation of U.S. patent application Ser. No. 15/710,911, filed Sep. 21, 2017, the disclosure of which is hereby incorporated by reference.

BACKGROUND

Users may consume audio content via a number of content consumption devices. Certain content consumption devices may be configured to receive voice-based commands, or may otherwise be configured to recognize speech. Such devices may provide audio content for consumption, such as music, news, and other audible content. Interruptions to audio content may be intrusive due to the serial nature of audio content consumption. For example, users listening to music may listen to a single song at a time, and interruptions to songs or between songs may be obtrusive. Accordingly, reducing interruptions and/or mitigating obtrusiveness to digital content consumption may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
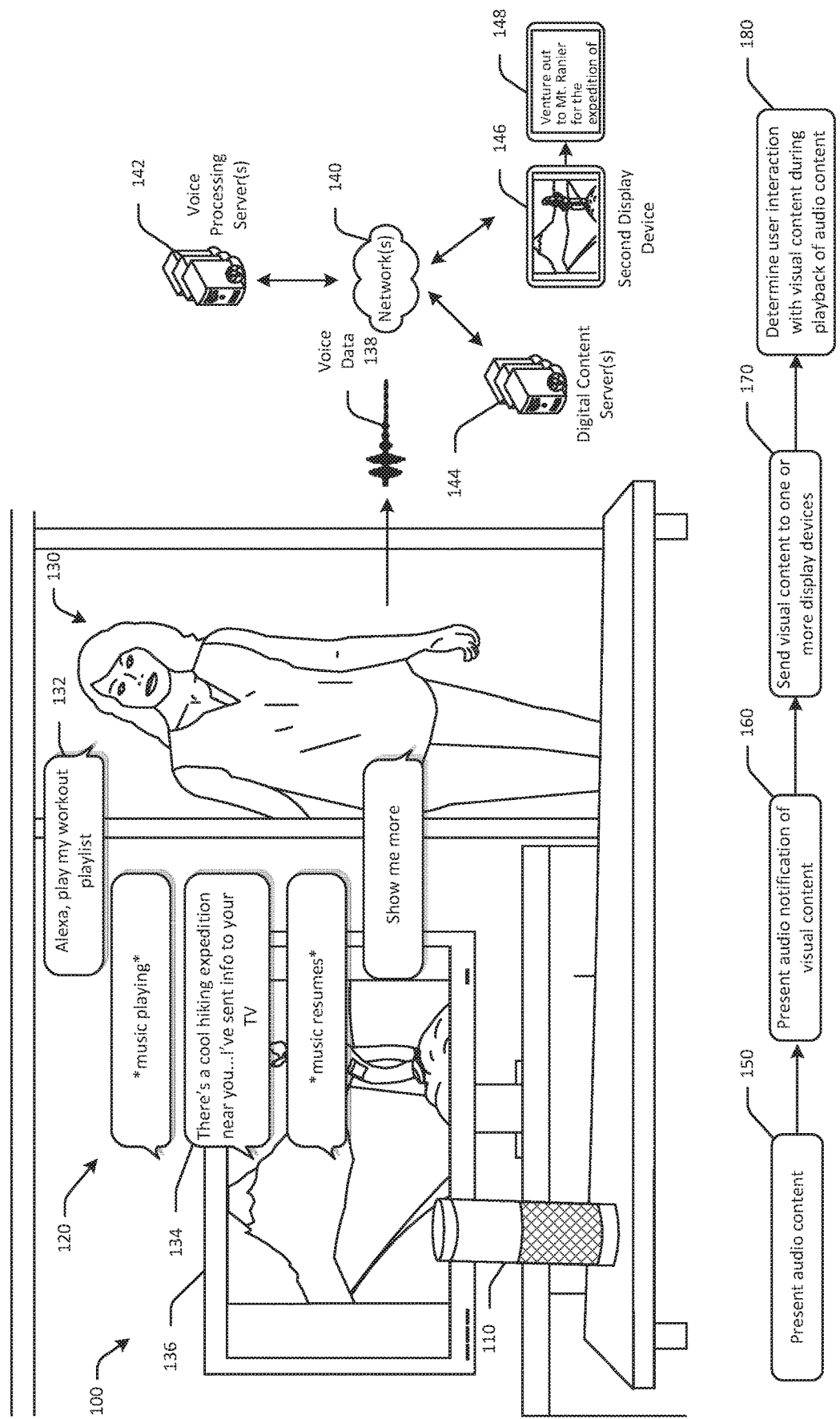
FIG. 1 is a schematic diagram of an example use case for presentation and management of audio and visual content across devices in accordance with one or more example embodiments of the disclosure.

Users may consume digital content, such as audio content or visual content, using one or more content consumption devices. Speaker devices may provide audio content, such as music, news, audio books, and other audible content, via one or more speakers for consumption by users. Audio content may be different from visual content in that presentation of audio content may be serial in nature. For example, users may listen to singular audio content at any given time (e.g., some users may not listen to two songs at the same time, while some users may watch more than one sporting event at the same time, etc.). Accordingly, interruptions to audio content, such as gaps between content, presentation of targeted or sponsored audio content, audible ads, and other interruptions to a desired stream of audio content may negatively impact a user experience. In addition, a length of time of an interruption may directly affect a user experience with audio-based content. For example, the longer the length of an interruption, the more impacted a listening user may be. Accordingly, targeted audio content or supplemental information may be useful to users, and may improve a user experience if limited to short and relevant interruptions in playback of audio content.

Embodiments of the disclosure include systems and methods for presentation and management of audio and visual content across devices. Certain embodiments may include audio or audible notifications that are audibly presented to listeners, and may include corresponding visual content that is presented at display devices. As a result, the length of the audio notification can be relatively short, and additional information can be presented at display devices in visual format for consumption by users while playback of a desired audio content stream resumes. Users may therefore be able to consume additional information and/or visual content, if desired, while at the same time embodiments may limit or reduce a length of time of interruptions to presentation of audio content desired by users. By presenting content with both audio and visual components, the length of the audio content component, such as an audio notification, can be reduced (thereby limiting interruptions), and the visual component can not only provide additional information, but may also provide interactive functionality that users can engage with while consuming a resumed audio content stream.

This disclosure relates to, among other things, devices, systems, methods, computer-readable media, techniques, and methodologies for presentation and management of audio and visual content across devices. Certain embodiments may generate audio notifications that indicate availability of visual content at one or more display devices. Visual content may be presented at one or more related display devices and may be presented in parallel (e.g., sent to more than one device associated with a user account at the same time, etc.) or in series (e.g., sent to a first device and then a second device based on user interactions or user locations in an ambient environment, while maintaining a state of the visual content across devices, etc.). A state of visual content (e.g., a state indicative of user interactions with visual content, such as user selections, inputs, and the like, etc.), which may be determined based at least in part on user interactions with the visual content, may be maintained across more than one user device, such as a television, a tablet, and other display devices. User interactions with the visual content may include interactions with the display device, such as taps, swipes, gestures for a camera or display, voice interactions, clicks, and so forth. In certain embodiments, a combination of voice-based and physical user interactions may be used to determine one or more response actions, such as placing orders for delivery of physical goods, initiating sound or video communications, capturing video or images, and other response actions. Audio content playback may resume immediately after audio notifications, so as to decouple the presentation of audio content and related or unrelated visual content.

Referring to FIG. 1, an example use case 100 for presentation and management of audio and visual content across devices is illustrated in accordance with one or more embodiments of the disclosure. An environment 100 may include a voice interaction device 110 that a user 130 can interact with. The voice interaction device 110 may communicate with one or more voice processing servers 142, one or more digital content servers 144, and/or one or more display devices, such as a television 136 and/or other second display devices 146 via one or more communication networks 140. The voice interaction device 110 may determine a meaning of utterances spoken by the user 130, and may generate audible content 120, such as audio notifications, comments, inquiries, and other audible content, in response to user utterances. The user 130 may interact with the voice interaction device 110, for example via a voice assistant or other audible or sound-based interaction technique. In some embodiments, the user 130 may interact with the voice interaction device 110 by providing analog sound input (e.g., voice, etc.) to the voice interaction device 110. The voice interaction device 110 may receive or detect the analog sound input and may generate digital voice data 138 representative of the analog sound input. The voice interaction device 110 may send the voice data 138 to the one or more voice processing server(s) 142 over the one or more wired or wireless communication networks 140 to determine a meaning of the sound input, or voice data 138. In some embodiments, the voice interaction device 110 may perform voice processing on the voice data 138 locally.

The voice interaction device 110 may be configured to generate the audible content 120 and may be, for example, a device such as a television, a laptop computer, a tablet, a computer monitor, a speaker-type device, augmented reality or virtual reality glasses or devices, or another device configured to output audio. The voice interaction device 110 may include or may utilize a speech interface device or other audio device, such as one or more speakers, that are capable of playing or presenting various types of audio. The voice interaction device 110 may include one or more microphones to detect ambient sound. The voice interaction device 110 may be located within the environment 100, such as a home, to provide services for the user 130. The voice interaction device 110 may operate in conjunction with and/or under the control of a remote network-based speech command service (e.g., voice processing server(s) 142, digital content server(s) 144, etc.) that is configured to receive audio, to recognize speech in the audio, and to perform functions or services in response to the recognized speech, or to generate audible dialog or audible content in response to recognized speech. The voice interaction device 110 may have one or more microphones and one or more audio speakers or transducers to facilitate speech or voice-based interactions with the user 130. The voice interaction device 110 may have a network communications interface for communicating over one or more communications networks 140. The voice interaction device 110 may receive or detect spoken expressions or utterances from the user 130 and may provide services, perform actions, or facilitate conversation or dialogue in response to the spoken utterances. For example, the user may speak an utterance with a verbal request. In some embodiments, the voice interaction device 110 may only be activated to listen upon determining that the user 130 has spoken a predefined wake or trigger expression (e.g., "Awake" or "Alexa," etc.), which may be followed by an utterance (e.g., "I'd like to go to a movie."). Provided services may include performing actions or activities, rendering media, obtaining and/or providing information, providing information via generated or synthesized speech via the voice interaction device 110, initiating Internet-based services on behalf of the user 130, performing actions relating to home automation and control, and so forth.

In the example of FIG. 1, the user 130 may initiate a conversation 132 with the voice interaction device 110 by speaking an audible request, such as "Alexa, play my workout playlist." In this embodiment, "Alexa" may be a trigger word or wakeword, and the voice interaction device 110 may detect or determine that a wakeword was spoken. In some embodiments, the voice interaction device 110 may not need to be triggered or engaged with a wakeword.

FIG. 1 depicts an example process flow in accordance with one or more embodiments of the disclosure. At block 150, the voice interaction device 110 may present audio content. For example, the voice interaction device 110 may receive or determine the utterance "Alexa, play my workout playlist" spoken by the user 130. The voice interaction device 110 may receive the verbal or audible request via an audio capture component, such as a microphone. The voice interaction device 110, either locally or in conjunction with the voice processing server(s) 142 and/or digital content server(s) 144, may determine that the user 130 is requesting presentation of an audio stream, or music from a workout music playlist that may be associated with a user account of the user 130.

The voice interaction device 110 may determine or select a song from the workout music playlist and begin playback of an audio stream, as indicated in the illustrated conversation 132. The music may be played by one or more speakers or devices associated with the voice interaction device 110. After the song ends, or at some point during presentation of the workout playlist music or other audio content, an interruption to the music or audio content may occur in some instances. For example, if the user 130 is listening to music provided by a free streaming service, audio ads may be dispersed through the playlist, such as between certain songs or after a certain length of time. Other interruptions may include incoming messages, news alerts, and the like.

In such instances, the voice interaction device 110 may present an audio notification of the interruption, rather than presenting a full length interruption, so as to improve the user experience with the voice interaction device 110 and/or the presentation of audio content, and reduce the length of the interruption. Visual content may be provided to a display device so that the user 130 can access and/or consume information related to the audio notification, without increasing an interruption length of time for the audio content.

For example, at block 160 of the process flow, the voice interaction device 110 may present an audio notification of visual content. In FIG. 1, the voice interaction device 110 may communicate with the voice processing server(s) 142 and/or the digital content server(s) 144 to determine an audio notification for presentation to the user 130. The audio notification may be an audio file or a text file associated with visual or graphic content, such as images or videos. The audio notification and/or visual content may be associated with or selected based at least in part on the audio content being presented (e.g., the workout playlist, etc.), or may be unrelated. In FIG. 1, an offer for a hiking expedition may be selected for presentation to the user 130. The hiking expedition offer may be selected, in one example, based at least in part on the user's affinity for exercise. In another example, a content category of the audio stream may be determined, and visual content for presentation to the user may be determined using the content category. The hiking expedition offer may have an audio notification component and one or more visual components that may be optionally interactive. In some instances, the audio notification may indicate that the visual content is available for consumption at a display device, such as the television 136. The voice interaction device 110 may present an audio notification 134 that states "there's a cool hiking expedition near you . . . I've sent info to your TV." In some embodiments, audio notifications may be audible questions, such as "would you like to see more?" after which visual content may be provided in response to an affirmative audible response from a user. Playback of the audio content, or music playlist in this example, may be paused or canceled during the audio notification, and may begin or resume immediately after, or after, presentation of the audio notification 134. Therefore, the length of the interruption may be the length of the notification, which may be relatively short.

At block 170 of the process flow, the visual content may be sent to one or more display devices. For example, the voice interaction device 110 or a related server may determine the visual content, and may determine one or more display devices associated with the user account of the user 130, or other display devices in the environment 100. Based at least in part on the types and/or number of devices, an active or inactive status of the respective devices, and/or a location of the user within the environment 100, the visual content may be sent to one or more devices. For example, the user 130 may have the television 136 in an active state, and the visual content may therefore be sent to the television 136 for presentation. Presentation, formatting, and/or layout for the visual content, as well as the content itself, may be determined based at least in part on display device characteristics and capabilities, such as size, processing power, and the like.

In some embodiments, the visual content may be sent to more than one device at the same time, or may be shared across devices while maintaining a state. For example, if the user 130 interacts with the visual content at a first device, such as the television 136, and then later interacts with a second device, such as a smartphone or specific mobile application, the visual content may be presented at the second device as if the user 130 had interacted with the content at the smartphone instead of the television 136 (e.g., the state of the visual content may be maintained, including previous selections, inputs, and other interactions made by the user, etc.).

For example, in FIG. 1, visual content related to the hiking expedition offer may be sent to the television 136, which may include a video or image of a woman hiking, and may be interactive. For example, the user 130 may be able to order or arrange a hiking expedition, share the offer with friends, see more content, and other functionality. The visual content may also be sent to a second display device 146, such as the user's smartphone in some embodiments. In other embodiments, the visual content may be sent to a first display device, or one display device at a time, and may be sent to a second display device if the user has not engaged with or interacted with the content at the first display device.

At block 180, a user interaction with the visual content may be determined while the audio content is being presented. For example, while the workout playlist is played, the user 130 may speak "show me more" after viewing the visual content on the television 136. As a result, second visual content may be sent to the television 136 and/or a second display device. For example, if it is determined that a user location has changed in an ambient environment, a second display device associated with the user account may be determined or selected for presentation of the first or second visual content. In one example, if the user 130 leaves the environment 100, second visual content 148 may be sent to the second display device 146 for presentation. The user 130 may interact with the second display device 146 and/or second visual content 148 at the second display device 146 or another device. The user 130 may interact with the second content 148 at the second display device 146 and place an order or perform another action, and an order confirmation may be sent to the user account and/or presented at a display device.

Certain embodiments may include voice assistants that process voice or speech and determine a meaning of the voice or speech, and may engage in conversations with users. Upon determining a meaning of the speech, embodiments of the disclosure may generate audible responses to the speech, so as to interact with one or more users. By determining a meaning or an intent of speech, and by generating relevant audible responses and/or managing presentation of visual content at various display devices, embodiments of the disclosure may actively interact with users, thereby resulting in increased functionality, for example, with respect to user requests made via speech. For example, a user may utter the phrase "show me more." Embodiments of the disclosure may determine that the user is interested in additional information, and may generate or cause presentation of visual content at one or more display devices while minimizing intrusion and/or interruption to audio content presentation.

Embodiments of the disclosure may facilitate presentation and management of audio and visual content across devices, and may include voice processing or speech recognition systems. Such systems may employ techniques to identify words spoken by a human user based on the various qualities of a received audio input. Speech recognition may be combined with natural language understanding processing techniques to enable speech-based user interaction with a computing device to perform tasks based on the user's spoken commands, or to engage in a conversation with a user. Speech processing may also convert a user's speech into text data which may then be provided to various text-based software applications.

The systems, methods, computer-readable media, techniques, and methodologies for systems and methods of presentation and management of audio and visual content across devices may therefore manage audio content, visual content, interactive states, and multiple devices. As a result of improved functionality, users may consume audio content with minimal interruption and may consume visual content at a later time or as desired.

Example embodiments of the disclosure provide a number of technical features or technical effects. For example, in accordance with example embodiments of the disclosure, certain embodiments of the disclosure may provide audio channels for targeted audio content, such as audio advertising, and may manage presentation of both audio and visual content across different display devices and audio or speaker devices. Due to the serial workflow of audio content, in that singular audio content may be presented at the same time (e.g., two songs cannot be played at once, etc.), presentation of audio content is distinguished from visual or graphic content. As a result, interaction with audio content, such as audio advertisements, is also distinguished from visual content. Embodiments of the disclosure may minimize intrusions or interruptions to desired audio content by decoupling audio and visual content. Embodiments of the disclosure may inject interactive audio advertisements on demand into other audio content (e.g., a music playlist, etc.). The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
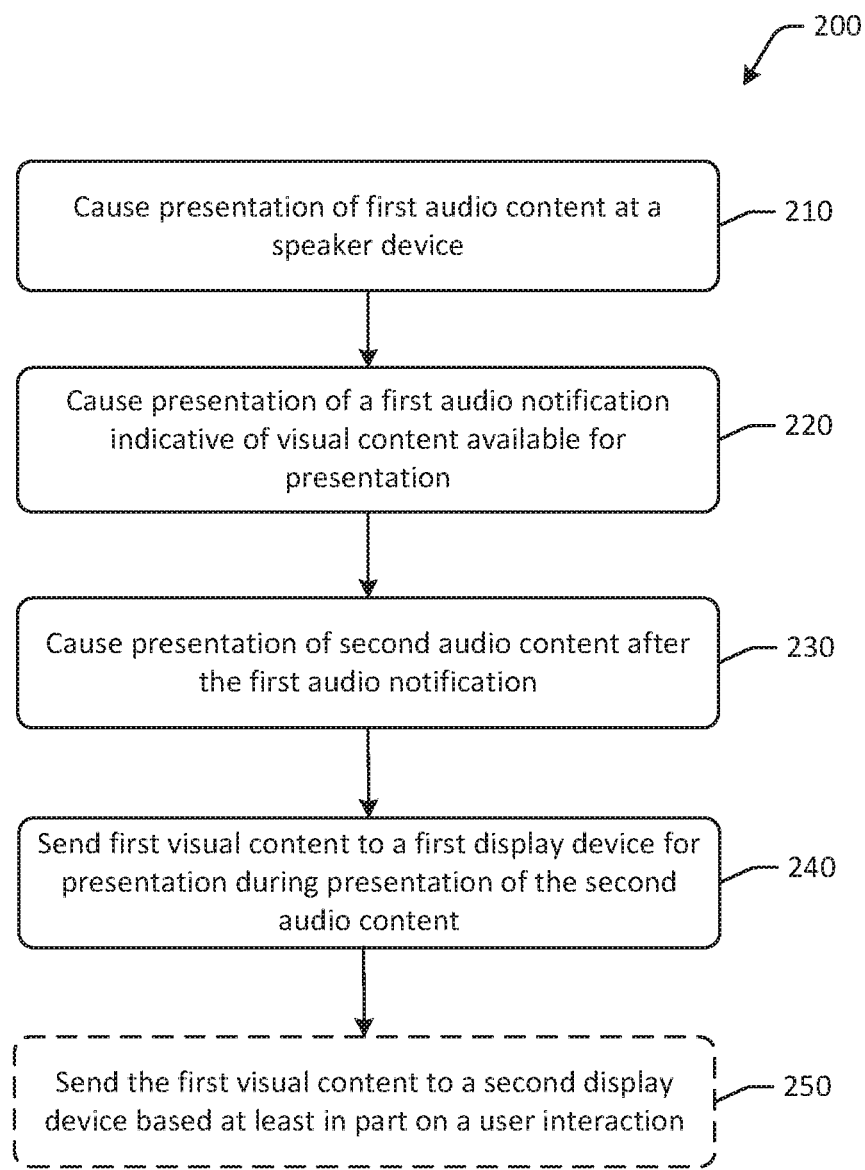
FIG. 2 is a schematic illustration of an example process flow for presentation and management of audio and visual content across devices in accordance with one or more example embodiments of the disclosure.

FIG. 2 depicts an example process flow 200 for presentation and management of audio and visual content across devices in accordance with one or more example embodiments of the disclosure. While example embodiments of the disclosure may be described in the context of certain audio or visual content, it should be appreciated that the disclosure is more broadly applicable to any suitable digital content. Some or all of the blocks of the process flows in this disclosure may be performed in a distributed manner across any number of devices. The operations of the process flow 200 may be performed in a different order.

At block 210 of the process flow 200, computer-executable instructions stored on a memory of a device, such as a voice interaction device or a server, may be executed to cause presentation of first audio content at a speaker device. For example, in response to a user's audible request for audio content, such as a music stream, presentation of first audio content may be caused at a speaker device.

For example, a voice interaction device may include one or more processors and at least one memory communicatively coupled to the one or more processors. The voice interaction device may be able to receive and transmit or send information via wired or wireless communication. The voice interaction device may include one or more microphones or other audio input device, and may include or otherwise be coupled to one or more speakers or speaker devices in some embodiments. The voice interaction device may receive voice input as analog sound input via one or more microphones.

In some embodiments, the voice input may be analyzed to determine whether the voice input included a wakeword or a trigger word. A trigger word may be a word of a set of one or more trigger words that indicates a type of request included in the voice input. Example types of requests, as described herein, may include search requests, such as content search requests, verbal queries, such as requests for information, including weather, news, and other information, requests for suggestions, including for activities, food, and other suggestions, and the like. Trigger words may be identified by comparing one or more words of the voice input to a table including the set of one or more trigger words. Identification of trigger words may be performed locally at the device in some embodiments, while in other embodiments, the device may receive an indication that the voice input included a trigger word, such as from one or more remote servers. In some embodiments, positioning or arrangement of words in the voice input may be used in determining whether the voice input includes a trigger word. For example, in some embodiments, if the first character or word of the voice input is not a trigger word, the voice input may be considered or determined to not include a trigger word.

At block 220 of the process flow 200, computer-executable instructions stored on a memory of a device may be executed to cause presentation of a first audio notification indicative of visual content available for presentation. For example, an audio notification may be indicative of available visual content that can be consumed at a display device. The visual content may be related to the content of the audio notification, or may be unrelated.

In some embodiments, the audio notification may be identified based at least in part on a correlation between the first audio content and one or more candidate advertisements or candidate advertisers. For example, a food related audio stream (e.g., a recipe, etc.) may be associated with food related candidate advertisements and/or candidate advertisers, while an entertainment related request may be associated with concert advertisements, movie theatre advertisers, and so forth.

Audio notifications may be associated with audio advertisement identifiers and may be "text-to-speech" files converted to audio by a voice interaction device, or could be audio files prepared by third party entities (such as advertisers) and presented via the voice interaction device. Audio notifications may be communicated to voice interaction devices via audio streams. Audio notifications may include speech, tones, chimes, audible alerts, and the like. In some instances, notifications may not be audio notifications. For example, rather than presenting an audio notification, or in addition to presenting an audio notification, a light (e.g., a light bar on a speaker device, etc.) or other visual indicator may be activated to notify a user of available visual content.

At block 230 of the process flow 200, computer-executable instructions stored on a memory of a device may be executed to cause presentation of second audio content after the first audio notification. For example, playback of audio content, such as an audio stream, may resume after presentation of the audio notification. The second audio content may be a portion of the first audio content or of the first audio stream, or may be different audio content.

At block 240, computer-executable instructions stored on a memory of a device may be executed to send first visual content to a first display device for presentation during presentation of the second audio content. For example, a data file with visual content may be sent to a first display device for presentation. The first display device may be selected based at least in part on an association with a user account, a user location, or determined based on another factor.

At optional block 250, computer-executable instructions stored on a memory of a device may be executed to send the first visual content to a second display device based at least in part on a user interaction. For example, if the first visual content was sent to a smartphone display device of the user, but the user interacts with a television display device before interacting with the smartphone, the first visual content may be sent to the television display device for consumption by the user, since the user did not interact with the smartphone display device.

Figure 3:
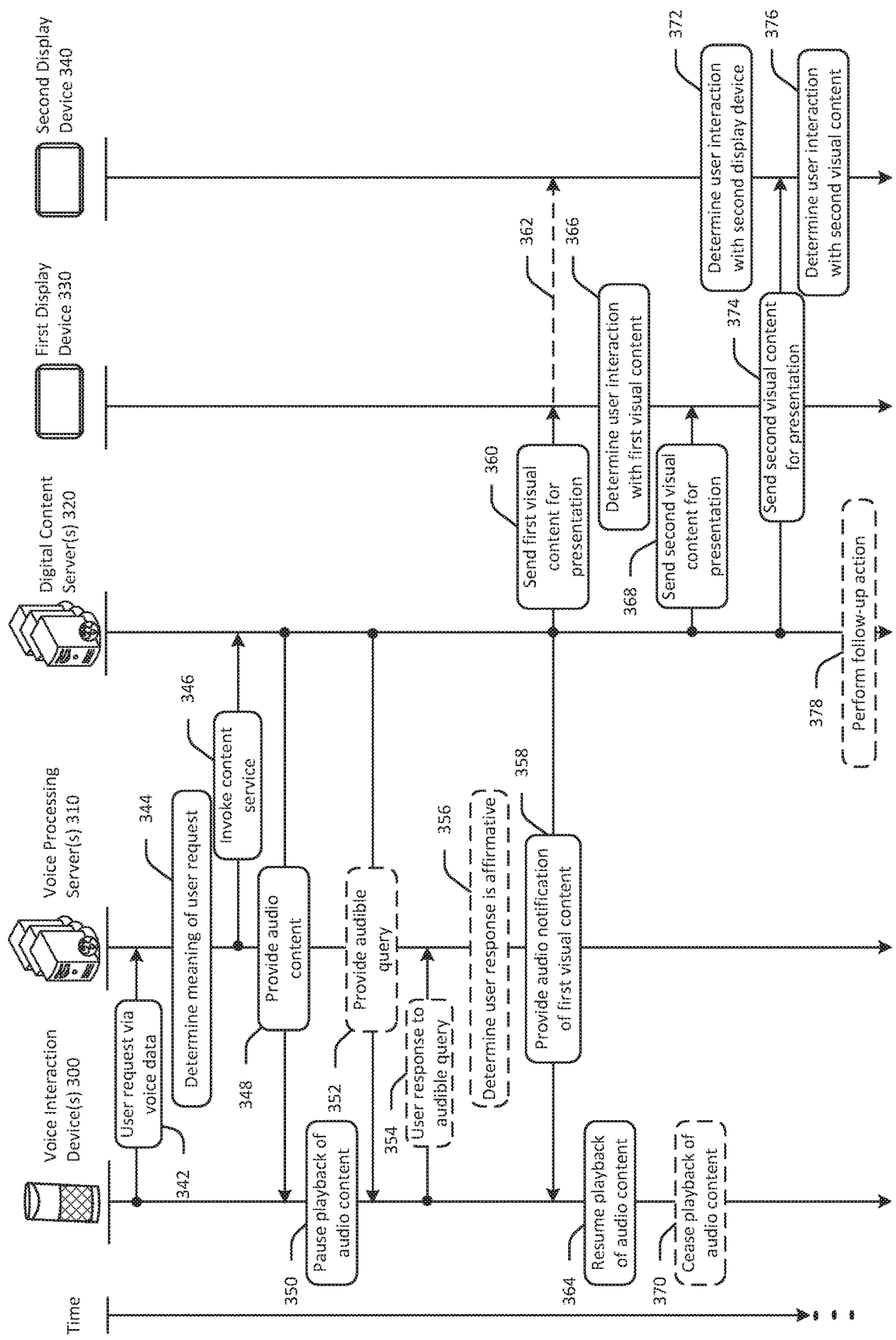
FIG. 3 is a schematic illustration of an example data flow for presentation and management of audio and visual content across devices in accordance with one or more example embodiments of the disclosure.

FIG. 3 illustrates an example dataflow for presentation and management of audio and visual content across devices in accordance with one or more embodiments of the disclosure. A dynamic voice assistance system may include one or more voice interaction devices 300, one or more voice processing servers 310, one or more digital content servers 320, a first display device 330, and/or a second display device 340. Each of the system components may be in communication via one or more networks. The voice interaction device 300 may be the same as the voice interaction device 110 of FIG. 1. In some embodiments, the voice interaction device 300 may be configured to present singular audio content at any given time, in that when music is playing, a single music track is generally playing, as opposed to two songs playing at once.

At operation 342, the voice interaction device 300 may send a user request made via voice data to the voice processing server(s) 310. The user request may be sent as voice data that is generated based at least in part on analog sound input. At operation 344, the voice processing server(s) 310 may determine a meaning of the user request. At operation 346, the voice processing server(s) 310 may invoke content service from the digital content server(s) 320. In response, the digital content server(s) 320 may provide audio content to the voice interaction device at operation 348.

At operation 350, the voice interaction device(s) 300 may pause playback of the audio content. Playback may be paused during a live stream, at predetermined times or locations, after completion of an audio segment, or at another time. At optional operation 352, the digital content server(s) 320 may provide an audible query to the voice interaction device(s) 300 for presentation. In some embodiments, another system or server may provide the audible query for presentation. The audible query may be an audio notification and may be an audible question in some embodiments. The audio notification may be indicative of the availability of related visual content in some instances.

At optional operation 354, a user response to the audible query may be determined by the voice interaction device(s) 300 and sent to the voice processing server(s) 310 to determine a meaning. At optional operation 356, the voice processing server(s) 310 may determine that the user response is affirmative. For example, in instances where the audible query is an audible question, a user response of "yes" or "sure" may be determined to be an affirmative response.

At operation 358, the digital content server(s) 320 may provide an audio notification of first visual content. The audio notification may be provided in response to the affirmative response, or may be provided in embodiments where there is no audible query. The audio notification may indicate the availability of related or unrelated visual content at one or more display devices. At operation 360, which may be at substantially the same time, before, or after operation 358, the digital content server(s) 320 may send the first visual content to the first display device 330 for presentation. In some embodiments, at optional operation 362 the digital content server(s) 320 may optionally send the first visual content to the second display device 340 for presentation. In some instances, visual content sent to a display device may not be immediately presented, and a notification of available visual content may be generated. For example, if a first user is using a speaker device, and a second user is using a television display device, visual content for the first user may be sent to the television display device, but may not interrupt the second user with immediate presentation. Instead, a notification indicating availability of the visual content may be presented. Active users may be determined by a logged in user account, by one or more cameras, and so forth. In some embodiments, a "save for later" option may be presented to users such that visual content can be accessed at a later time at one or more display devices. Presentation of visual content may be delayed based at least in part on a user request.

At operation 364, the voice interaction device(s) 300 may result playback of audio content after presentation of the audio notification. At operation 366, the first display device 330 may determine a user interaction with the first visual content. For example, the user may have selected a "learn more" or "order now" user interface element presented at the first display device 330. At optional operation 370, the voice interaction device(s) 300 may cease playback of audio content. For example, if playback of a requested song is complete, the playback of audio content may cease.

Based at least in part on the first user interaction, at operation 368, the digital content server(s) 320 may send second visual content to the first display device 330 for presentation. However, at operation 372, the second display device 340 may determine a user interaction with the second display device 340. As a result, the second visual content, or the visual content in its current state, may be handed off from the first display device 330 to the second display device 340. For example, at operation 374, the digital content server(s) 320 may send the second visual content to the second display device 340 for presentation. At operation 376, the second display device 340 may determine a user interaction with the second visual content.

At operation optional operation 378, the digital content server(s) 320 may perform a follow-up action, which may be based at least in part on the user interaction with the second visual content, such as placing an order, sending a message, making a call, ordering a service, changing a setting, controlling another device, or another follow-up action.

As a result, users can engage with visual content after playback of audio content has ceased, during presentation of unrelated audio content, or on their own time, so as to limit the interruption or intrusion on the user's consumption of audio content.

Figure 4:
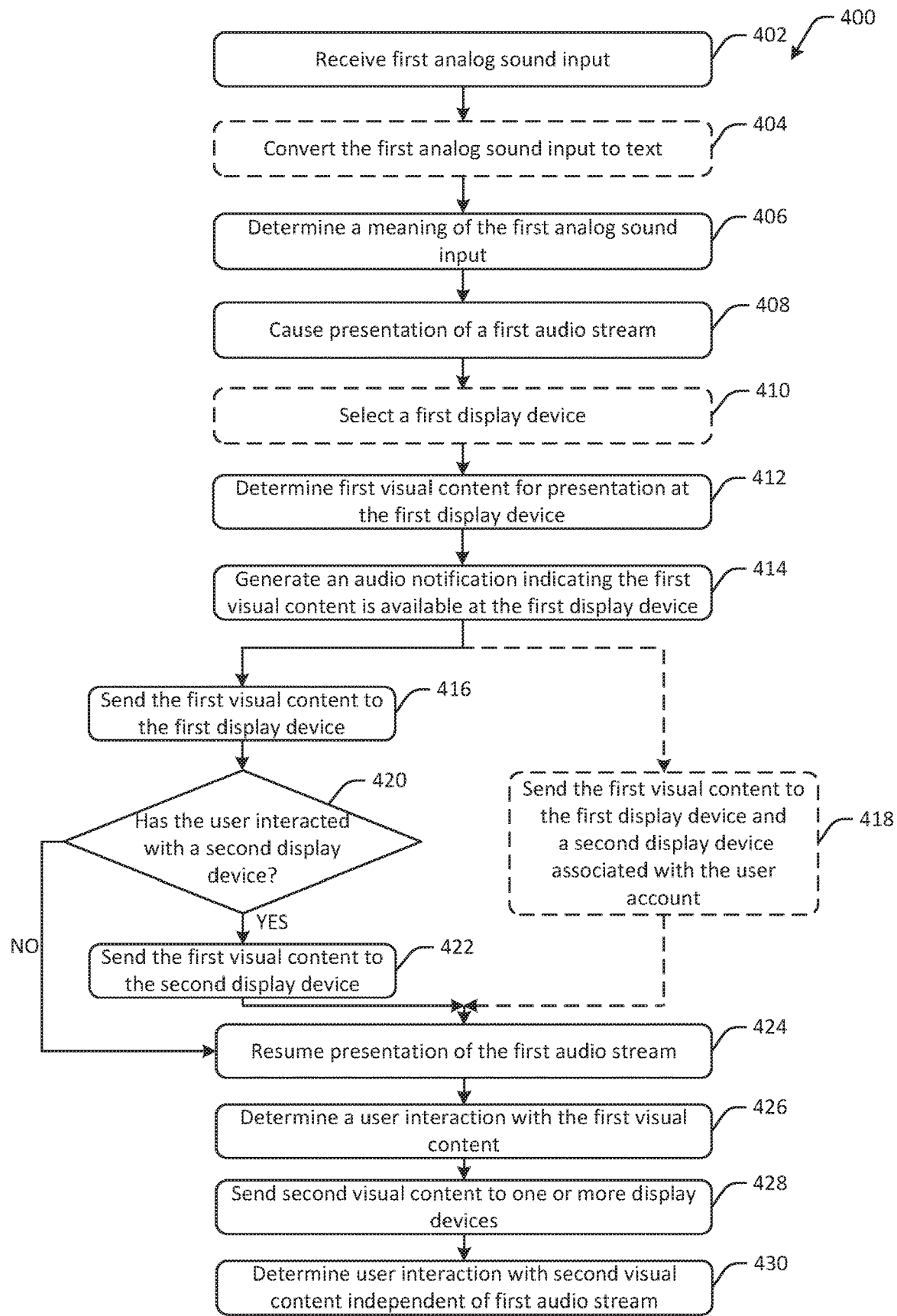
FIG. 4 is a schematic illustration of an example process flow for presentation and management of audio and visual content across devices in accordance with one or more example embodiments of the disclosure.

FIG. 4 depicts an example process flow 400 for presentation and management of audio and visual content across devices in accordance with one or more embodiments of the disclosure. Block 402 of the process flow includes receiving first analog sound input. For example, analog sound input or voice data may be received via one or more microphones configured to generate signals based at least in part on incident or ambient sounds, or speech input. In certain example embodiments, the one or more microphones may be configured to receive sound input in the form of analog sound and may generate electrical signals indicative of the analog sound. Processing circuitry may convert the analog sound to digital voice data using an analog-to-digital converter (ADC). Digital voice data may be generated from the analog sound input using the ADC.

Optional block 404 of the process flow includes converting the first analog sound input to text data. The text data may include a textual representation of a user utterance, which may be the analog sound input and/or voice data. Block 406 includes determining a meaning of the first analog sound input. For example, embodiments of the disclosure may determine a keyword associated with the text data, and may use the keyword to identify or determine a user request based at least in part on the keyword. At block 408, presentation of a first audio stream is caused. For example, a user may request a news briefing, a song, a music playlist, or other audio content, and a first audio stream of the requested content or other content may be presented at a speaker device.

At optional block 410, a first display device is selected. The first display device may be selected for presentation of visual content. The visual content may be related to an audio notification that may be provided to the user during or in between segments of the first audio stream. Display device selection may be determined based at least in part on one or more factors. For example, if it is determined that a user is present in an ambient environment of the first display device, the first display device may be selected. As a result, display devices in the immediate vicinity or ambient environment of the user may be prioritized for selection over other devices. The likelihood of a user interacting with the visual content may be increased if the display device is in the vicinity of the user. Presence of a user may be determined by one or more cameras, one or more microphones (e.g., if a device detects a sound or speech from a user, the user may be determined to be in the vicinity of the device, etc.). In another example, display device selection may be based at least in part on a determination that a display device is in an active state. For example, a display device that is currently presenting content, or recently received a user interaction, may be determined to be in an active state, as opposed to a device that is currently off or in a sleep or power save mode. Such factors may indicate the user is currently using the display device, and the device may therefore be selected for presentation of the visual content.

In one example, display device selection may be based at least in part on user location. For example, a camera on a display device may be used to determine that a user is at a first location physically closest to the display device. Distance may be determined by using an image captured via a camera, or by using a volume or intensity of sound captured by a microphone of a device relative to images or sound captured by other devices. User location may be updated periodically or based on certain events, such that if it is determined that the user has moved to a second location physically closest to a second display device, visual content may be sent to the second display device instead of, or in addition to, the first display device.

At block 412, first visual content may be determined for presentation at the first display device. The first visual content may be selected based at least in part on user characteristics or a user profile or account of a user listening to the first audio stream. At block 414, an audio notification indicating that the first visual content is available at the first display device may be generated. The audio notification may be an alert, a tone, an audible message, or other notification that informs the user of the availability of visual content. In some embodiments, the audio notification may be presented before selection of the first display device.

The visual content may be sent to one device at a time, or may be sent to more than one device at a time, so as to increase a likelihood of interaction and decrease presentation latency. For example, at block 416, the first visual content may be sent to the first display device. The user may interact with the first visual content at the first display device. For example, a first user interaction with the first visual content may be determined at the first display device, and second visual content may be sent to the first display device.

At determination block 420, it may be determined whether the user has interacted with a second display device. For example, the user may have been using a television, and so the television may have been selected as the first display device, but the user may have interacted with a smartphone, which may be a second display device. If it is determined that the user interacted with a second display device, the process flow 400 may proceed to block 422, at which the first visual content may be sent to the second display device. The process flow 400 may proceed to block 424. If it is determined at determination block 420 that the user has not interacted with a second display device, the process flow 400 may proceed to block 424.

Alternately, at optional block 418, the first visual content may be sent to the first display device and a second display device associated with the user account. In either arrangement, the first visual content may be presented during presentation of the first audio stream (or a subsequent audio stream). The process flow 400 may proceed to block 424.

At block 424, presentation of the first audio stream may resume after the audio notification is presented. At block 426, a user interaction with the first visual content may be determined. For example, the user may make a selection of a user interface selectable element, or may input information, or may otherwise interact with the first visual content.

At block 428, second visual content may be sent to one or more display devices. The second visual content may be sent to the most recently active display device, another display device, or multiple display devices. Visual content may be handed off between multiple devices while maintaining a state or status of the visual content across display devices.

At block 430, a user interaction with the second visual content may be determined independent of the first audio stream. For example, while the first audio stream continues to be presented, or after the first audio stream has ceased, the user may still interact with the visual content. Visual content may be entirely unrelated to audio streams or content that is being presented at a speaker device. Accordingly, the user has increased flexibility in consuming the visual content, while limiting the interruption to the first audio stream.

In some embodiments, different visual content may be sent to different display devices. For example, visual content with a promotional offer to buy movie tickets to the movie Captain America vs. Iron Man may include first visual content with an image of Captain America sent to a first display device and second visual content with an image of Iron Man sent to a second display device. The user may interact with either or both the first visual content and the second visual content to participate in the offer.

Audio ads may be placed and/or presented within existing audio streams (e.g., two minutes into a morning briefing or after 30 minutes of music playback), in response to user requests for which no information is otherwise available, etc. Embodiments of the disclosure may also present visual ads at other devices based at least in part on user interactions and/or conversations.

One or more operations of the methods, process flows, or use cases of FIGS. 1-4 may have been described above as being performed by a user device, or more specifically, by one or more program module(s), applications, or the like executing on a device. It should be appreciated, however, that any of the operations of the methods, process flows, or use cases of FIGS. 1-4 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 5:
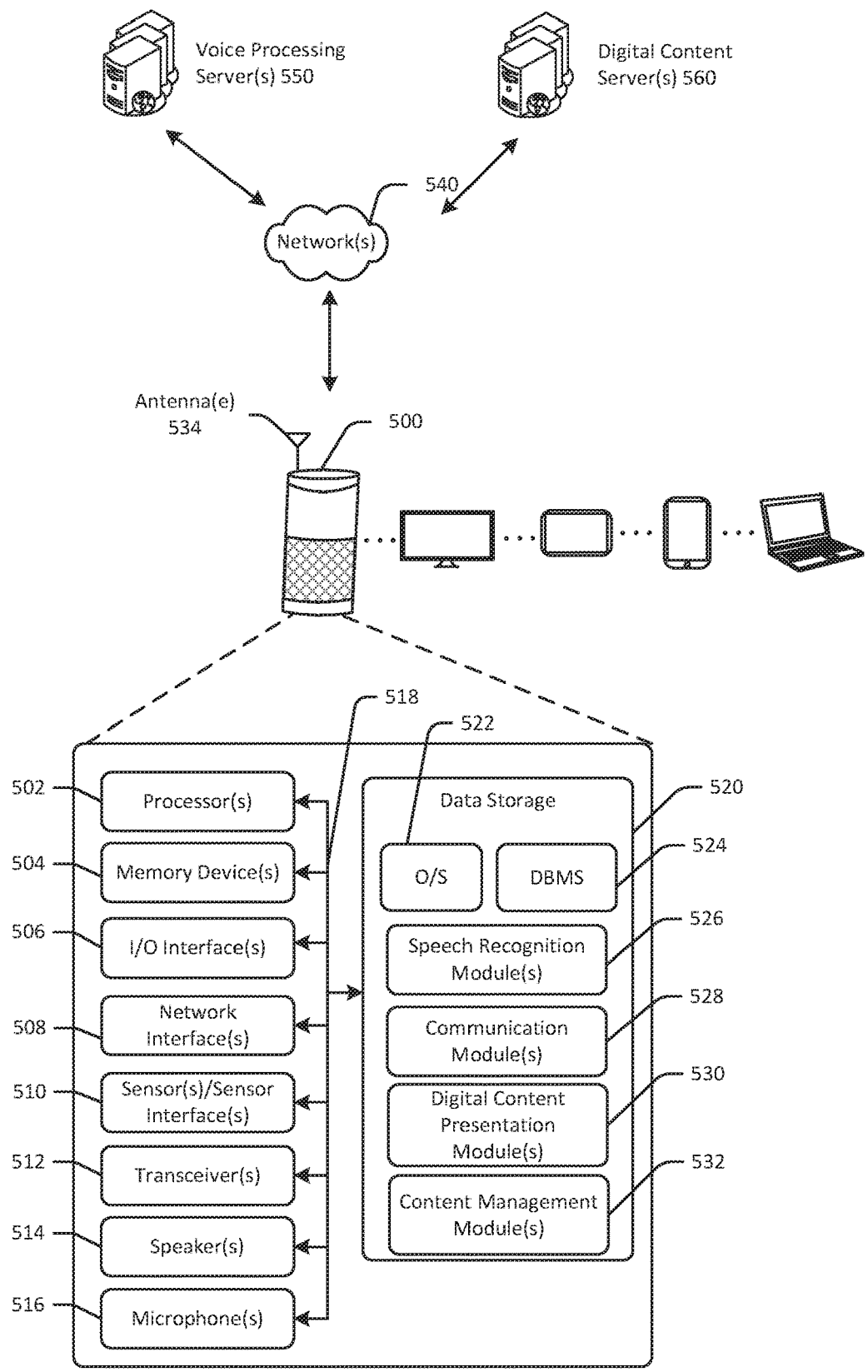
FIG. 5 is a schematic block diagram of an illustrative voice assistant device in accordance with one or more example embodiments of the disclosure.

FIG. 5 is a schematic block diagram of an illustrative voice interaction device 500 in accordance with one or more example embodiments of the disclosure. The voice interaction device 500 may include any suitable computing device capable of receiving and/or generating audio including, but not limited to, a mobile device such as a smartphone, tablet, e-reader, wearable device, or the like; a desktop computer; a laptop computer; a content streaming device; a set-top box; or the like. The voice interaction device 500 may correspond to an illustrative device configuration for the voice interaction devices of FIGS. 1-4.

The voice interaction device 500 may be configured to communicate via one or more networks 540 with one or more servers, user devices, or the like. For example, in the illustration of FIG. 5, the voice interaction device 500 may be configured to communicate with a voice processing server(s) 550 and a digital content server(s) 560. The voice processing server(s) 550 may be configured to perform a first type of voice processing, such as conversational voice processing, while the digital content server(s) 560 may be configured to perform audio content streaming functionality and visual content selection and management functionality. In some embodiments, a single remote server or single group of remote servers may be configured to perform more than one type of voice processing and/or audio content streaming functionality.

Network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the voice interaction device 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more optional speakers 514, one or more optional microphones 516, and data storage 520. The voice interaction device 500 may further include one or more buses 518 that functionally couple various components of the voice interaction device 500. The voice interaction device 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the voice interaction device 500. The bus(es)

518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the voice interaction device 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more speech recognition module(s) 526, one or more communication module(s) 528, one or more digital content presentation module(s) 530, and/or one or more content management module(s) 532. Some or all of these module(s) may be sub-module(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support functionality described in reference to correspondingly named components earlier in this disclosure.

The data storage 520 may further store various types of data utilized by components of the voice interaction device 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, purchase history information, device identifier information, user profile information, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the voice interaction device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the user interaction monitoring module(s) 526 may include computer-executable instructions, code, or the like that responsive to execution by one or more of the processor(s) 502 may perform functions including, but not limited to, monitoring user interaction data at user devices, determining real-time or near real-time user interaction metrics for a number of different pieces of content or cards from a plurality of user devices, receiving user interaction data from a plurality of devices, determining user action events and frequencies of occurrences, defining user action events, and the like.

The communication module(s) 528 may include computer-executable instructions, code, or the like that responsive to execution by one or more of the processor(s) 502 may perform functions including, but not limited to, communicating with one or more devices, for example, via wired or wireless communication, communicating with remote servers, communicating with remote datastores, sending or receiving notifications, communicating with cache memory data, and the like.

The digital content presentation module(s) 530 may include computer-executable instructions, code, or the like that responsive to execution by one or more of the processor(s) 502 may perform functions including, but not limited to, generating audio content, presenting audio via the speakers 514, sending digital content to one or more devices, causing presentation of digital content including audio content and visual content, and the like.

The content management module(s) 532 may include computer-executable instructions, code, or the like that responsive to execution by one or more of the processor(s) 502 may perform functions including, but not limited to, determining devices to present certain content, selecting content for presentation, performing response actions, and the like.

Referring now to other illustrative components depicted as being stored in the data storage 520, the O/S 522 may be loaded from the data storage 520 into the memory 504 and may provide an interface between other application software executing on the voice interaction device 500 and hardware resources of the voice interaction device 500. More specifically, the O/S 522 may include a set of computer-executable instructions for managing hardware resources of the voice interaction device 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the voice interaction device 500 is a mobile device, the DBMS 524 may be any suitable light-weight DBMS optimized for performance on a mobile device.

Referring now to other illustrative components of the voice interaction device 500, the input/output (I/O) interface(s) 506 may facilitate the receipt of input information by the voice interaction device 500 from one or more I/O devices as well as the output of information from the voice interaction device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the voice interaction device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The voice interaction device 500 may further include one or more network interface(s) 508 via which the voice interaction device 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna(e) 534 may include any suitable type of antenna depending, for example, on the communications protocols used to transmit or receive signals via the antenna (e) 534. Non-limiting examples of suitable antennas may include directional antennas, non-directional antennas, dipole antennas, folded dipole antennas, patch antennas, multiple-input multiple-output (MIMO) antennas, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the voice interaction device 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the voice interaction device 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 514 may be any device configured to generate audible sound. The optional microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the voice interaction device 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the voice interaction device 500 may include alternate and/or additional hardware, software, or firmware components beyond those described or depicted without departing from the scope of the disclosure. More particularly, it should be appreciated that software, firmware, or hardware components depicted as forming part of the voice interaction device 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
   a display;
   a microphone;
   memory that stores computer-executable instructions; and
   at least one processor configured to access the memory and execute the computer-executable instructions to:
      receive first voice input;
      cause analysis of the first voice input to determine that both a trigger word and a request are present in the first voice input;
      cause presentation of first audio content at a speaker device in response to the first voice input;
      determine first visual content associated with the request;
      determine a user account associated with the device;
      cause the first visual content to be sent to a first display device for presentation, wherein the first display device is associated with the user account;
      cause presentation of a first audio notification indicative of visual content available at the first display device;
      determine, while the first visual content is presented at the first display device, a first user interaction with a second display device; and
      send the first visual content to the second display device.

2. The device of claim 1, wherein the device is further configured to execute the computer-executable instructions to:
   determine selection of an audio playback option at a user interface of the first display device;
   cause presentation of second audio content at the speaker device;
   receive second voice input; and
   cause presentation of third audio content at the speaker device.

3. The device of claim 2, wherein the second audio content is a text-to-speech presentation of a first portion of the first visual content, and the third audio content is a text-to-speech presentation of a second portion of the first visual content.

4. The device of claim 1, wherein the device is further configured to execute the computer-executable instructions to:
   receive second voice input indicating a request for audio playback of the first visual content;
   cause presentation of second audio content at the speaker device, wherein the second audio content is a text-to-speech presentation of a first portion of the first visual content;
   receive third voice input; and
   cause presentation of third audio content at the speaker device, wherein the third audio content is a text-to-speech presentation of a second portion of the first visual content.

5. The device of claim 1, wherein the device is further configured to execute the computer-executable instructions to:

determine that a user is at a first location physically closest to the first display device;
determine that the user has moved to a second location physically closest to the second display device; and
send the first visual content to the second display device.

6. The device of claim 1, wherein the device is further configured to execute the computer-executable instructions to:
determine a second user interaction with the first visual content at the first display device;
send second visual content to the first display device;
determine a third user interaction with the second display device; and
send the second visual content to the second display device.

7. The device of claim 1, wherein the device is further configured to execute the computer-executable instructions to:
determine a second user interaction with a third display device; and
send the first visual content to the third display device.

8. A method comprising:
receiving, by a speaker device associated with a user account, first voice input;
causing analysis of the first voice input to determine that both a trigger word and a request are present in the first voice input;
causing presentation of first audio content at the speaker device in response to the first voice input;
determining first visual content associated with the request;
causing the first visual content to be sent to a first display device for presentation, wherein the first display device is associated with the user account;
causing presentation of a first audio notification indicative of visual content available at the first display device;
determining, while the first visual content is presented at the first display device, a first user interaction with a second display device; and
sending the first visual content to the second display device.

9. The method of claim 8, further comprising:
determining selection of an audio playback option at a user interface of the first display device;
causing presentation of second audio content at the speaker device;
receiving second voice input; and
causing presentation of third audio content at the speaker device.

10. The method of claim 9, wherein the second audio content is a text-to-speech presentation of a first portion of the first visual content, and the third audio content is a text-to-speech presentation of a second portion of the first visual content.

11. The method of claim 8, further comprising:
receiving second voice input indicating a request for audio playback of the first visual content;
causing presentation of second audio content at the speaker device, wherein the second audio content is a text-to-speech presentation of a first portion of the first visual content;
receiving third voice input; and
causing presentation of third audio content at the speaker device, wherein the third audio content is a text-to-speech presentation of a second portion of the first visual content.

12. The method of claim 8, further comprising:
determining that a user is at a first location physically closest to the first display device;
determining that the user has moved to a second location physically closest to the second display device; and
sending the first visual content to the second display device.

13. The method of claim 8, further comprising:
determining a second user interaction with the first visual content at the first display device;
sending second visual content to the first display device;
determining a third user interaction with the second display device; and
sending the second visual content to the second display device.

14. The method of claim 8, further comprising:
determining a second user interaction with a third display device; and
sending the first visual content to the third display device.

15. A device comprising:
memory that stores computer-executable instructions; and
at least one processor configured to access the memory and execute the computer-executable instructions to:
receive an indication from a first display device indicating a request to send a portion of first visual content to a speaker device;
determine the speaker device associated with the first display device;
cause presentation of first audio content at the speaker device, the first audio content representing a first portion of the first visual content;
receive first voice input;
cause presentation of second audio content at the speaker device, the second audio content representing a second portion of the first visual content;
determine, while the first visual content is presented at the first display device, a first user interaction with a second display device; and
send the first visual content to the second display device.

16. The device of claim 15, wherein the at least one processor is further configured to execute the computer-executable instructions to:
determine that a trigger word is present in the first voice input;
determine a user account associated with the device; and
cause presentation of a first audio notification indicative of content available at the speaker device.

17. The device of claim 15, wherein the first audio content is a text-to-speech presentation of the first portion of the first visual content, and the second audio content is a text-to-speech presentation of the second portion of the first visual content.

18. The device of claim 15, wherein the at least one processor is further configured to execute the computer-executable instructions to:
determine that a user is at a first location physically closest to the first display device;
determine that the user has moved to a second location physically closest to the second display device; and
send the first visual content to the second display device.

* * * * *